Figure 1:
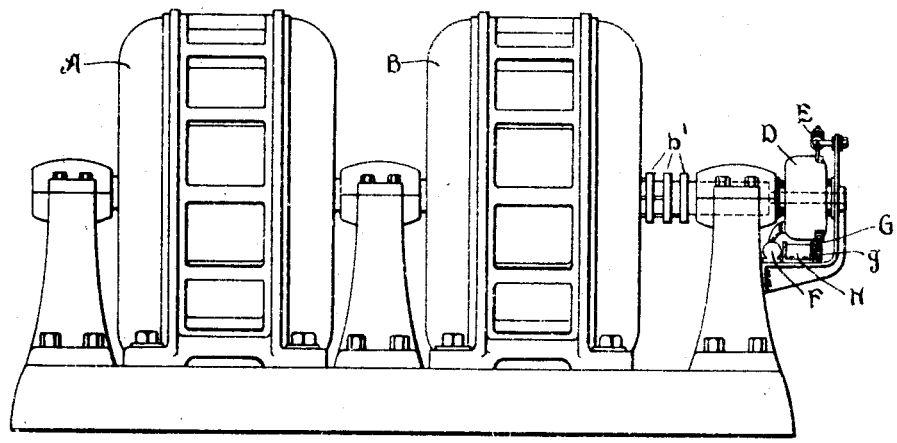

No. 869,413.

PATENTED OCT. 29, 1907.

W. S. BRALLEY.
FREQUENCY CHANGER.
APPLICATION FILED FEB. 5, 1907.

2 SHEETS—SHEET 1.

WITNESSES:
W. Ray Taylor.

INVENTOR
WALTER S. BRALLEY,
BY
ATT'Y.

UNITED STATES PATENT OFFICE.

WALTER S. BRALLEY, OF SCHENECTADY, NEW YORK, ASSIGNOR TO GENERAL ELECTRIC COMPANY, A CORPORATION OF NEW YORK.

FREQUENCY-CHANGER.

No. 869,413.  Specification of Letters Patent.  Patented Oct. 29, 1907.

Application filed February 5, 1907. Serial No. 355,839.

To all whom it may concern:

Be it known that I, WALTER S. BRALLEY, a citizen of the United States, residing at Schenectady, in the county of Schenectady and State of New York, have invented certain new and useful Improvements in Frequency-Changers, of which the following is a specification.

My invention relates to frequency-changers, and its object is to provide a novel means for tying together two transmission systems of different frequency, so as to enable one system to supply power to the other.

It occasionally happens that power-transmission systems of different frequency may be extended into proximity to each other, and that it is desired to tie the two systems together, so that one system may help out the other at times of overload. For this purpose frequency-changers have been employed heretofore, consisting of synchronous motor-generator sets. Such a set is not wholly satisfactory for this purpose, since in the first place the load on the set is determined by the relative field-strength of the machines and cannot readily be controlled automatically; and in the second place if a short-circuit occurs on one system, the set is overloaded and may be thrown out of step giving a short-circuit on the second system before the circuit-breakers open.

My invention consists in employing in place of the synchronous motor-generator set a pair of asynchronous induction machines with short-circuited secondaries, primaries supplied from the two systems, respectively, and rotors mechanically connected. For controlling the load on the machine I rely on the fall in frequency of the overloaded system. This drop, if the speed-governors at the generating station are not adjusted for close regulation, will be sufficient to load the frequency generator, for if the two machines are designed to rotate at the same speed when both systems are lightly loaded, then when the frequency of one system falls, the speed of the induction machine connected to that system tends to fall, so that it acts as an induction generator driven by the other machine as a motor. Since, in large machines, the full-load slip may be less than one per cent., a drop in frequency of less than two per cent. in one of the systems will result in a transfer of power from one system to the other equal in amount to the full load of the set. The control of the load on the set is thus entirely automatic. Furthermore, a short-circuit on either system can have no bad effect upon the set, since the magnetizing current of the machine connected to the short-circuited system immediately fails and the other machine runs idle under the frictional load of the set.

My invention further comprises an overload device arranged to insert resistance in the circuit of one of the machines. For the operation of this device I utilize the increase in slip due to an overload, by employing a small induction machine with its rotor on the same shaft with the main machines, and a stator rotatably mounted but restrained from movement by a spring. This small regulating machine may be supplied from either transmission system. With ordinary slips its torque is small, but with an abnormal increase of slip its torque increases, so as to produce a movement of the stator which may be utilized to actuate a resistance-controlling switch.

Figure 2:
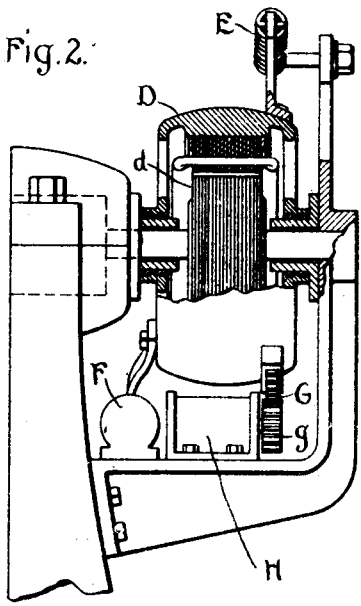
Figure 3:
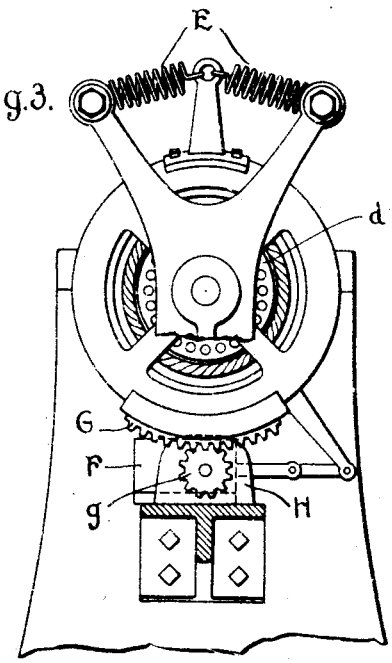

My invention will best be understood by reference to the accompanying drawings, in which Figure 1 shows a side elevation of a frequency-changer arranged in accordance with my invention; Fig. 2 shows an enlarged view, partly in cross-section, of the induction governor; Fig. 3 shows an end elevation of the same; and Fig. 4 shows diagrammatically the connections and arrangement of windings of the machines.

In the drawings A and B represent the stators of two induction machines, of which the rotors are mounted on the same shaft. These machines are arranged with different numbers of poles corresponding to the frequencies of the systems to which their primaries are connected. For instance, if the frequencies of the two systems are 40 and 25 cycles, the stator A may be arranged for 10 poles and the stator B for 16 poles.

Figure 4:
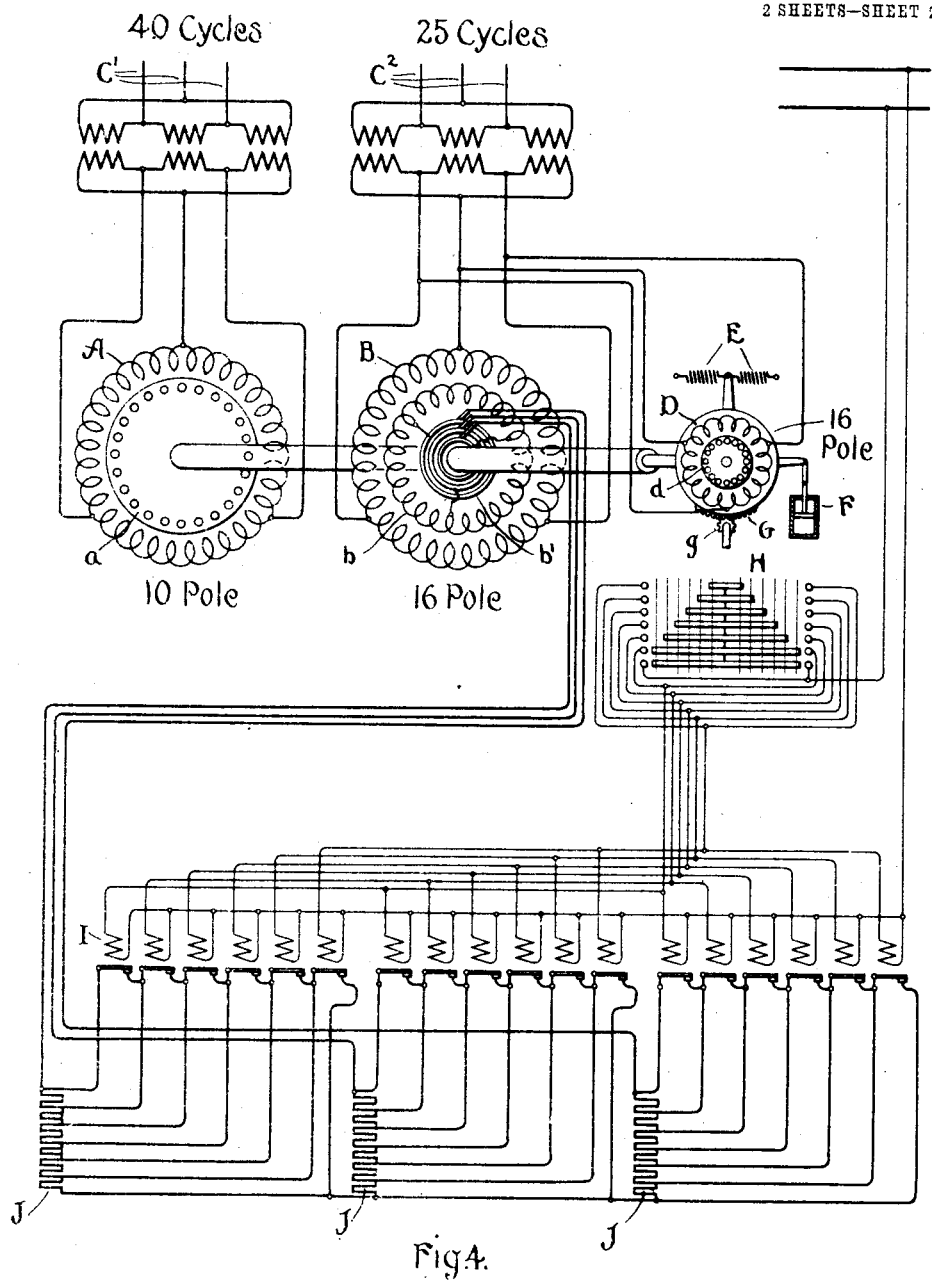

In order to avoid complicating the diagram of Fig. 4, no attempt is made to show the pole-numbers of the machines in the representation of the winding itself. In this figure the primary windings are shown connected through step-down transformers to the transmission systems $C^1$ and $C^2$. The secondary winding $a$ of one machine may be of the squirrel-cage type, while the secondary winding $b$ of the other machine is preferably coil-wound with its terminals connected to collector-rings $b^1$.

On the same shaft with the rotors of the main machine is mounted the rotor $d$ of a small induction motor, the stator of which is represented by D. This stator is rotatably mounted, as shown in Figs. 2 and 3, but is restrained from movement by springs E. The stator or primary winding is connected in parallel with either of the main machines and has a corresponding number of poles. A dash-pot F retards the movement of the stator D when it is moved against the tension of the springs E. The stator D is connected mechanically in any suitable manner, as by the rack G and pinion $g$, with a controlling switch H, which controls the circuit of a plurality of magnetically-actuated switches or contactors I, which, in turn, control resistances J connected to the secondary $b$ through the collector-rings $b^1$. The stator D is normally held in the position shown in the drawings so that switch H is normally in the off-position, all of magnet windings L are deënergized, and resistances J short-circuited. The small induction machine is an overload device, and in normal operation the resistances remain short-circuited.

The operation of the frequency-changer is as follows: When both systems are unloaded, the speed at which the two induction machines tend to run is the same, so that they divide the friction load of the set. Now, if the frequency of one of the systems falls, due to a load on the system, the speed at which the machine connected to that system tends to run is lowered, and if the speed is lowered a sufficient amount, this machine tends to run as a generator driven by the other machine as a motor. Since the drop in frequency on the loaded system is proportional to the load, the difference in the speeds at which the two induction machines tend to run is proportional to the load, and this difference determines the load on the machines, so that the regulation is entirely automatic. If one system should be so heavily overloaded as to drop the frequency of the system below normal limits, thereby overloading the induction machines, the small induction machine D comes into action. Since the rotor of this machine is on the same shaft with the rotors of the main machines, its slip is the same as the slip of the main machines, and it is so designed that with normal slip, the torque between stator and rotor is not sufficient to move the stator against the tension of springs E; but if the main induction machines are overloaded, so that the slip increases above normal value, the torque of the small induction machine is increased so that its stator is moved in one direction or the other, according as its slip is positive or negative, so as to move switch H from its central position and energize a portion or all of magnet windings I. These magnet windings act to insert portions of resistances J in circuit with the secondary winding $b$, thereby decreasing the torque between secondary $b$ and primary B, increasing the slip and consequently reducing the load on the set. The movement of the stator D is retarded and steadied by the dash-pot F. When the overload is removed from the set, so that the slip of the induction machine decreases, the torque in the small induction machine is decreased, and the stator is returned to its normal position by the springs E.

I do not desire to limit myself to the particular construction and arrangement of parts here shown, but aim in the appended claims to cover all modifications which are within the scope of my invention.

What I claim as new and desire to secure by Letters Patent of the United States, is,

1. In combination with two transmission systems, two asynchronous induction machines having their primaries supplied from said systems respectively, their secondaries short-circuited, and their rotors mechanically connected to each other.

2. In combination with two transmission systems, two asynchronous induction machines having their rotors on the same shaft and their primaries supplied from said systems respectively and their secondaries short-circuited.

3. In combination with two transmission systems, two asynchronous induction machines having their primaries supplied from said systems respectively, their secondaries short-circuited, and their rotors mechanically connected to each other, and means for automatically controlling the slip of said machines on overload.

4. In combination with two transmission systems, two asynchronous induction machines having their primaries supplied from said systems respectively, their secondaries short-circuited, and their rotors mechanically connected to each other, and automatic means for increasing the resistance of the secondary circuit of one of said machines upon an overload.

5. In combination with two transmission systems, two asynchronous induction machines having their primaries supplied from said systems respectively, their secondaries short-circuited, and their rotors mechanically connected to each other, a small induction machine supplied from one of said systems having its rotor mechanically connected to the rotors of the main machines and its stator rotatably mounted, yielding means for restraining the movement of the stator, and means controlled by the movement of said stator for varying the resistance of the secondary circuit of one of the main machines.

6. In combination with two transmission systems, two asynchronous induction machines having their primaries supplied from said systems respectively, their secondaries short-circuited, and their rotors mechanically connected to each other, a small induction machine supplied from one of said systems having its rotor mechanically connected to the rotors of the main machines and its stator rotatably mounted, a spring opposing the movement of the stator, a switch mechanically connected to the stator, and a resistance controlled by said switch in circuit with the secondary winding of one of the main machines.

7. In combination with two transmission systems, two asynchronous machines having their primaries supplied from said systems respectively, their secondaries short-circuited, and their rotors mechanically connected to each other, an overload device, and means controlled thereby for inserting resistance in the secondary circuit of one of said machines.

In witness whereof, I have hereunto set my hand and affixed my seal this 2nd day of February, 1907.

WALTER S. BRALLEY.

Witnesses:
BENJAMIN E. HULL,
HELEN ORFORD.